(12) United States Patent  
Kida et al.

(10) Patent No.: US 10,191,586 B2  
(45) Date of Patent: Jan. 29, 2019

(54) DISPLAY APPARATUS, METHOD FOR DRIVING DISPLAY APPARATUS, AND POINTING DEVICE

(71) Applicant: Japan Display Inc., Tokyo (JP)

(72) Inventors: Yoshitoshi Kida, Tokyo (JP); Makoto Hayashi, Tokyo (JP); Kohei Azumi, Tokyo (JP); Shinya Iuchi, Tokyo (JP); Fumitaka Gotoh, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/944,243

(22) Filed: Apr. 3, 2018

(65) Prior Publication Data

US 2018/0225002 A1 Aug. 9, 2018

Related U.S. Application Data

(62) Division of application No. 14/883,821, filed on Oct. 15, 2015.

(30) Foreign Application Priority Data

Nov. 19, 2014 (JP) .................................. 2014-234104

(51) Int. Cl.
*G06F 3/033* (2013.01)
*G06F 3/0354* (2013.01)
(Continued)

(52) U.S. Cl.
CPC .......... *G06F 3/0416* (2013.01); *G06F 3/0383* (2013.01); *G06F 3/03545* (2013.01); *G06F 3/044* (2013.01)

(58) Field of Classification Search
CPC .......... G06F 3/033; G06F 3/041; G06F 3/044; G06F 3/042; G06F 3/045
See application file for complete search history.

(56) References Cited

U.S. PATENT DOCUMENTS 6,016,114 A 1/2000 Liu  
8,199,132 B1 6/2012 Oda  
(Continued)

FOREIGN PATENT DOCUMENTS

JP 2012-128556 7/2012  
JP 2012-221304 11/2012  
JP 2013-058198 3/2013

OTHER PUBLICATIONS

Japanese Office Action dated Jan. 30, 2018 in corresponding Japanese Application No. 2014-234104.

*Primary Examiner* — Chanh D Nguyen  
*Assistant Examiner* — Nguyen H Truong  
(74) *Attorney, Agent, or Firm* — K&L Gates LLP

(57) ABSTRACT

In a display apparatus, a touch panel where driving and sensing electrodes face each other across a dielectric substance outputs a detection signal from the sensing electrode in synchronization with a driving signal applied to the driving electrode. A pointing device points to a position on a touch surface of the touch panel. A detection assisting device includes an inverting circuit for obtaining a detection driving signal corresponding to the driving signal and inverting the phase thereof to generate an inversion signal, and outputs the inversion signal to the sensing electrode via the pointing device. A control device applies the driving signal to the driving electrode, obtains the detection signal generated at the sensing electrode according to the mutual capacitance between the driving and sensing electrodes and the inversion signal, and detects the pointing device in contact with or proximity to the touch panel based on the detection signal.

4 Claims, 12 Drawing Sheets

(51) Int. Cl.
*G06F 3/041* (2006.01)
*G06F 3/044* (2006.01)
*G06F 3/038* (2013.01)

(56) References Cited

U.S. PATENT DOCUMENTS

| | | |
|---|---|---|
| 2012/0256830 A1 | 10/2012 | Oda |
| 2013/0057491 A1 | 3/2013 | Chu et al. |
| 2014/0022203 A1 | 1/2014 | Karpin |
| 2014/0160085 A1 | 6/2014 | Rabii |
| 2014/0198075 A1* | 7/2014 | Yeh .................. G06F 3/044 345/174 |
| 2014/0347311 A1 | 11/2014 | Joharapurkar |
| 2016/0349897 A1 | 12/2016 | Ishikawa |

* cited by examiner

ONE EXAMPLE OF PATTERN WITHOUT NOISE

ONE EXAMPLE OF PATTERN WITH NOISE

DISPLAY APPARATUS, METHOD FOR DRIVING DISPLAY APPARATUS, AND POINTING DEVICE

CROSS-REFERENCE TO RELATED APPLICATION

This application is a divisional application of U.S. application Ser. No. 14/883,821, filed on Oct. 15, 2015, which application is based upon and claims the benefit of priority of the prior Japanese Patent Application No. 2014-234104, filed on Nov. 19, 2014, the entire contents of which are incorporated herein by reference.

BACKGROUND

A display apparatus with a touch panel, which a user touches with a finger, a stylus, or the like, to input information, is used in various fields. As one of such touch panel systems, an electrostatic-capacitance type touch panel capable of reducing the power consumption is known. When the area of a screen of a touch panel is small, the capability of inputting using a stylus with a narrow tip is preferred. However, in the electrostatic-capacitance type touch panel, a stylus with a narrow contact area has a poor contact-detection sensitivity because the electrostatic capacitance generated at a contact portion needs to be equal to or greater than a predetermined level. Then, in order to improve operability, there is proposed a display apparatus with a stylus that outputs an active signal toward a detection unit. (See, for example, Japanese Laid-open Patent Publication No. 2013-58198).

SUMMARY

The embodiments discussed herein provide a display apparatus capable of reliably detecting the presence or absence of touch, a method for driving the display apparatus, and a pointing device.

According to an aspect of the embodiments, there is provided a display apparatus including: a touch panel including a driving electrode and a sensing electrode that faces at least a part of the driving electrode across a dielectric substance, the touch panel being configured to output a detection signal from the sensing electrode in synchronization with a driving signal applied to the driving electrode; a pointing device configured to point to a position on a touch surface of the touch panel; a detection assisting device including an inverting circuit configured to obtain a detection driving signal corresponding to the driving signal detected by the pointing device and generate an inversion signal by inverting a phase of the detection driving signal, the detection assisting device being configured to output the inversion signal to the sensing electrode via the pointing device; and a control device configured to apply the driving signal to the driving electrode, obtain the detection signal that is generated at the sensing electrode according to a mutual capacitance between the driving electrode and the sensing electrode and the inversion signal, and detect the pointing device in contact with or proximity to the touch panel based on the detection signal.

The object and advantages of the invention will be realized and attained by means of the elements and combinations particularly pointed out in the claims.

Additional features and advantages are described herein, and will be apparent from the following Detailed Description and the figures.

DETAILED DESCRIPTION

Figure 1:
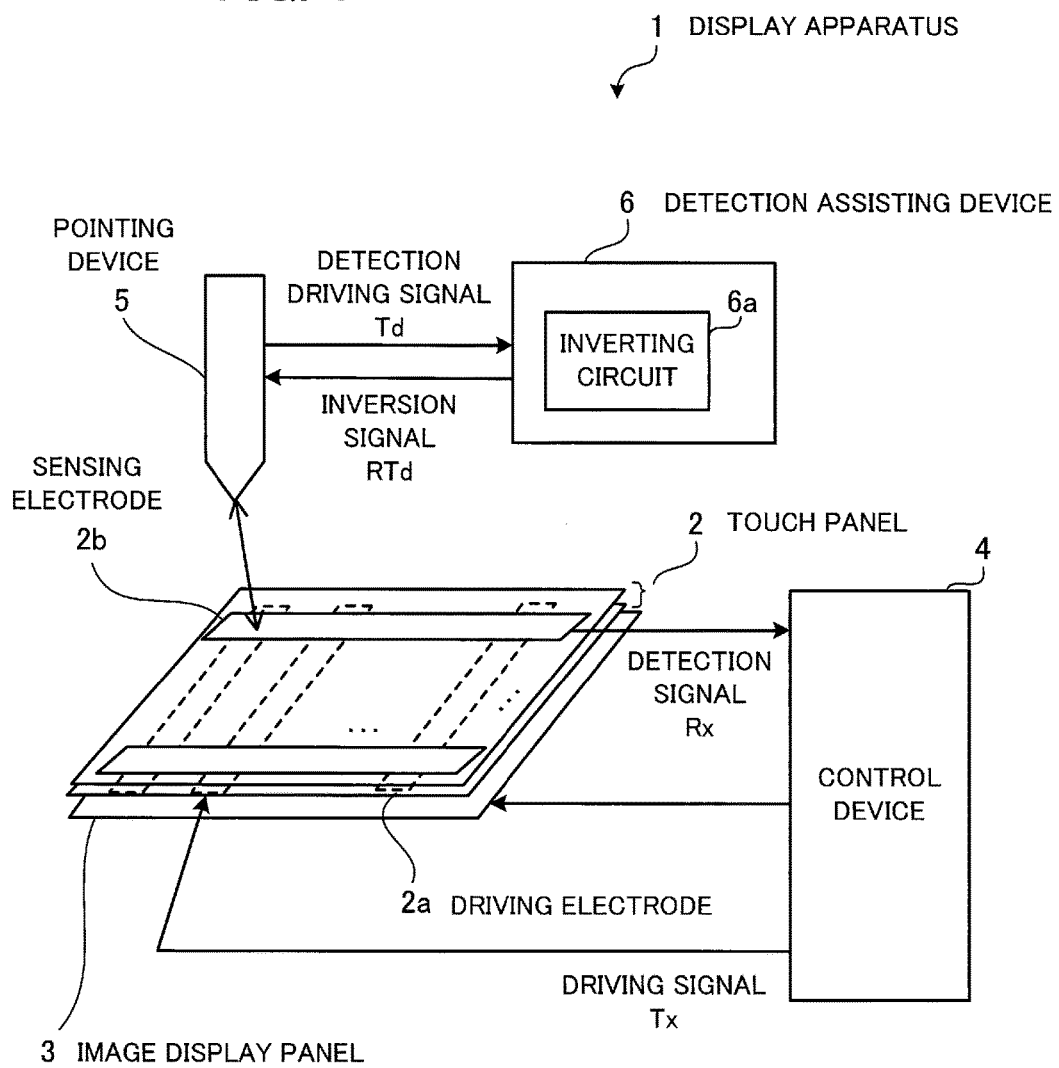
FIG. 1 illustrates an example of the configuration of a display apparatus of a first embodiment.

Embodiments of the present application will be described below in detail with reference to the drawings.

Note that the disclosed embodiments are just one example, and thus the appropriate modifications that may be readily conceived to those skilled in the art without departing from the spirit of the embodiments shall be included in the scope of the embodiments. Moreover, for clarity of description, in the drawings the width, thickness, shape, and the like of each unit may be schematically illustrated as compared with the actual embodiments, but the width, thickness, shape, and the like of each unit are just one example and shall not limit the interpretation of the embodiments.

Moreover, in the embodiments and the drawings, components similar to those described in regard to a drawing thereinabove may be marked with like reference numerals to omit the detailed description as appropriate.

First Embodiment

A display apparatus of a first embodiment is described using FIG. 1. FIG. 1 illustrates an example of the configuration of the display apparatus of the first embodiment.

A display apparatus 1 illustrated in FIG. 1 includes a touch panel 2, an image display panel 3, a control device 4, a pointing device 5, and a detection assisting device 6.

The touch panel 2 includes a driving electrode 2a and a sensing electrode 2b that faces at least a part of the driving electrode 2a across a dielectric substance, in which the sensing electrode 2b is arranged on a touch surface side of the touch panel 2. In the touch panel 2, a plurality of driving electrodes 2a and a plurality of sensing electrodes 2b are arranged such as to cover the touch surface area. Hereinafter, a configuration of the driving electrode 2a and sensing electrode 2b will be described, in which a part of the driving electrode 2a and a part of the sensing electrode 2b cross each other to form a facing portion, but the same applies to the other driving electrodes and sensing electrodes.

The facing portion at which the driving electrode 2a and the sensing electrode 2b face each other has a first capacitance formed by the driving electrode 2a, the dielectric substance, and the sensing electrode 2b. When a driving signal Tx of a square waveform is applied to the driving electrode 2a, a detection signal Rx may be detected by the sensing electrode 2b in synchronization with the driving signal Tx. That is, when the driving signal Tx is applied to the driving electrode 2a, an electric charge corresponding to the mutual capacitance between the driving electrode and the sensing electrode is accumulated in the sensing electrode 2b. If the charge amount in the sensing electrode 2b is extracted as the detection signal Rx, the mutual capacitance between the driving electrode and the sensing electrode may be measured. Because the mutual capacitance differs between when the pointing device 5 is in contact with or proximate to the touch panel 2 and when the pointing device 5 is apart from the touch panel 2, the presence or absence of the touch of the pointing device 5 may be also detected by measuring the mutual capacitance. In FIG. 1, the driving electrode 2a and sensing electrode 2b have belt-like shapes extending in mutually orthogonal directions of the touch panel 2, respectively, and the facing portion is formed at a place where the driving electrode 2a and the sensing electrode 2b cross each other, but the embodiments are not limited thereto.

The image display panel 3 includes a planar display surface, and displays an image based on a display signal output from the control device 4.

The control device 4 is connected to the image display panel 3, the driving electrode 2a, and the sensing electrode 2b, and performs a display control to display an image on the image display panel 3 and a detection control to detect the touch of the pointing device 5. In the detection control, the driving signal Tx of a square waveform is applied to the driving electrode 2a and the detection signal Rx is obtained from the sensing electrode 2b. From the sensing electrode 2b, the detection signal Rx having a rising edge and a falling edge each being in synchronization with the timing of potential change of the driving signal Tx is output.

The pointing device 5 points to a position on the touch surface of the touch panel 2. The pointing device 5 in contact with or proximate to the touch panel 2 is electrically connected or coupled to the touch panel 2 to form a second capacitance. A detection driving signal Td obtained by detecting the driving signal Tx that is input via the sensing electrode 2b of the touch panel 2 in contact with or proximate to the pointing device 5 is output to the detection assisting device 6. Moreover, the pointing device 5 obtains an inversion signal RTd from the detection assisting device 6, and outputs it to the sensing electrode 2b using a capacitive coupling between an output circuit of the pointing device 5 and the sensing electrode 2b, or the like.

The detection assisting device 6 includes an inverting circuit 6a, obtains the detection driving signal Td from the pointing device 5, generates the inversion signal RTd by inverting the phase of the detection driving signal Td, and outputs it to the pointing device 5. Note that the detection assisting device 6 may be provided inside another device. For example, it may be provided in the pointing device 5 or the control device 4.

A touch detection operation of such a display apparatus 1 is described. Hereinafter, a state where the pointing device 5 is in contact with or proximate to the touch panel 2 is referred to and described as a "touch state", while a state where the pointing device 5 is neither in contact with nor proximate to the touch panel 2 is referred to and described as a "non-touch state".

When the pointing device 5 is in the non-touch state, the mutual capacitance between the driving electrode 2a and the sensing electrode 2b corresponds to the first capacitance. When the driving signal is applied to the driving electrode 2a by the control device 4, an electric field corresponding to the first capacitance will be generated between the driving electrode and the sensing electrode. On the other hand, when the pointing device 5 is in the touch state, a part of the electric field is generated also between the pointing device 5 and the sensing electrode 2b due to the second capacitance between the pointing device 5 and the sensing electrode 2b. As a result, the electric field between the driving electrode and the sensing electrode decreases and the mutual capacitance also decreases. Furthermore, the inversion signal RTd having a phase opposite to the phase of the driving signal Tx is output to the sensing electrode 2b via the pointing device 5 from the detection assisting device 6. The inversion signal RTd acts in the direction assisting the signal change of the detection signal Rx due to the pointing device 5, via the capacitive coupling between the pointing device 5 and the sensing electrode 2b.

As described above, in the detection signal Rx, a signal component of the inversion signal RTd is superposed on a signal component (referred to as a detection signal Rx0) corresponding to the mutual capacitance between the driving electrode and the sensing electrode. Therefore, the signal strength of the detection signal Rx is increased as compared with the detection signal Rx0 simply corresponding to the mutual capacitance between the driving electrode and the sensing electrode. In the control device 4, the presence or absence of touch may be reliably detected by detecting the touch state of the pointing device 5 using the detection signal Rx whose signal strength has been increased in this manner.

Second Embodiment

Next, a display apparatus of a second embodiment is described.

Figure 2:
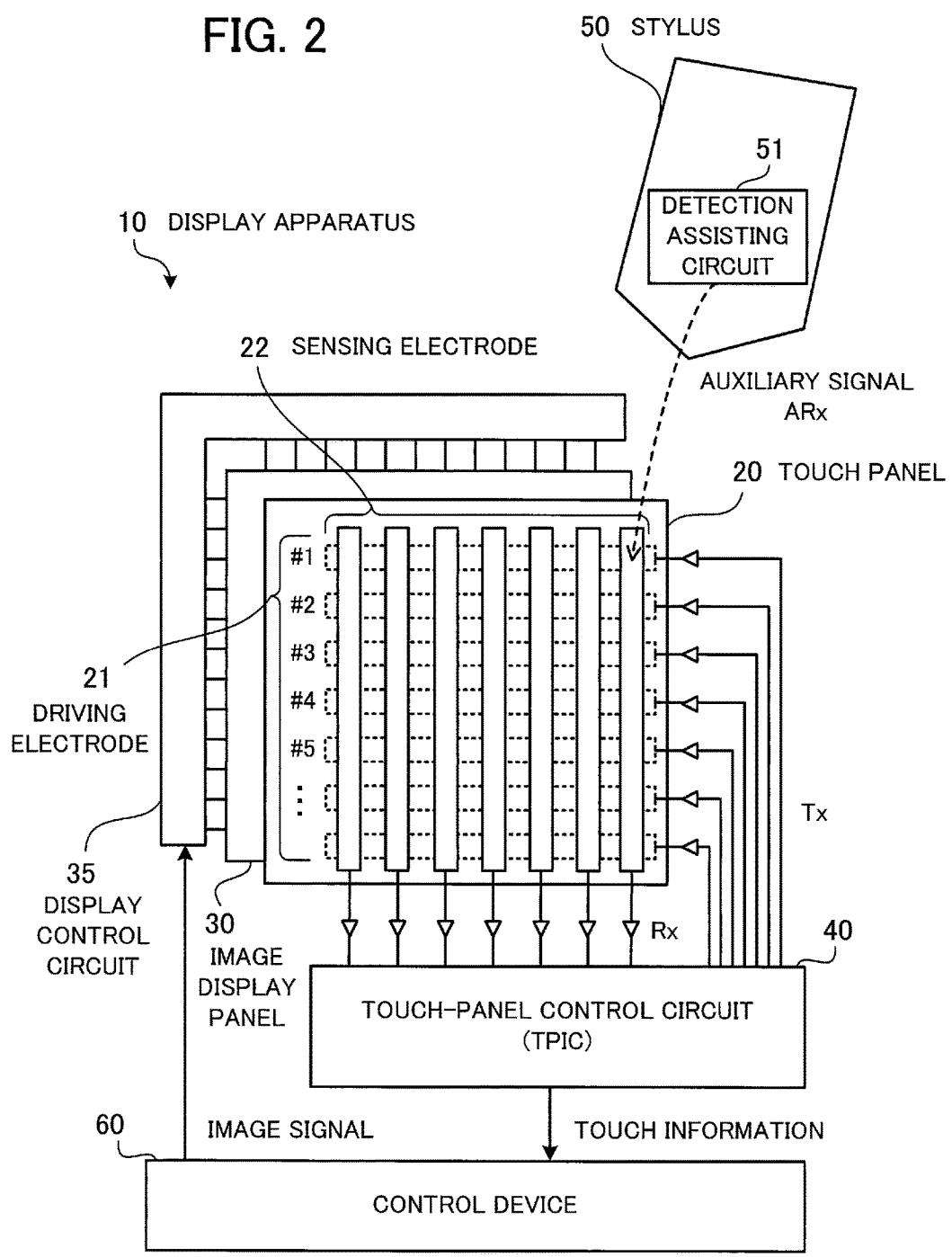
FIG. 2 illustrates an example of the configuration of a display apparatus of a second embodiment.

FIG. 2 illustrates an example of the configuration of the display apparatus of the second embodiment.

A display apparatus 10 of the second embodiment includes a touch panel 20, an image display panel 30, a display control circuit 35, a touch-panel control circuit (hereinafter, referred to as a TPIC) 40, a stylus 50, and a control device 60. The display control circuit 35, the TPIC 40, and the control device 60 perform a part of the procedure of the control device 4 illustrated in FIG. 1, respectively. Moreover, the detection assisting device 6 illustrated in FIG. 1 is mounted as a detection assisting circuit 51 inside the stylus 50.

The touch panel 20 is a mutual-capacitance detection type touch panel that includes a plurality of belt-like driving electrodes 21 extending in the horizontal direction in FIG. 2 and a plurality of belt-like sensing electrodes 22 extending in the direction perpendicular to the extending direction of the driving electrode 21. The sensing electrode 22 is arranged on the touch surface side of the touch panel 20, while the driving electrode 21 is arranged in a lower layer of the sensing electrode 22 across a dielectric substance. The driving electrode 21 and the sensing electrode 22 cross each other in a plan view, and at the intersection, a facing portion where the driving electrode 21 and the sensing electrode 22 face each other is formed. The facing portion serves as a touch sensor, and in the touch panel 20, facing portions are arranged in a matrix so as to be able to detect a touch position of the stylus 50. The TPIC 40 outputs to the control device 60 the touch information including the detected presence or absence of the touch of the stylus 50 and the position of the stylus 50 when touch has been detected.

The image display panel 30 is configured as the so-called in-cell type, i.e., integrated with the touch panel 20. In the in-cell type configuration, the driving electrode 21 of the touch panel 20 and the common electrode of a liquid crystal display element are shared. Note that the touch panel 20 and the image display panel 30 may be separately formed and then bonded with an adhesive or the like.

The display control circuit 35 performs a display control among the processing functions of the control device 4. The display control circuit 35 receives an image signal from the control device 60 to generate a display signal, thereby performing the display control of the image display panel 30.

The TPIC 40 performs a detection control to detect the touch of the stylus 50, among the processing functions of the control device 4. In accordance with an instruction from the control device 60, the TPIC 40 sequentially selects the driving electrode 21 to supply a driving signal of an AC square waveform driving signal. Then, the TPIC 40 detects the presence or absence of the touch of the stylus 50 and the position of the stylus 50 when the stylus 50 is in the touch state, based on the detection signal of the sensing electrode 22 at that time.

The stylus 50 is one embodiment of the pointing device 5, and in the second embodiment, the stylus 50 includes the detection assisting circuit 51. The detection assisting circuit 51 generates an auxiliary signal ARx whose phase is opposite to the phase of the driving signal Tx, based on the detection driving signal Td corresponding to the driving signal Tx that is detected when the tip of the stylus 50 approaches the touch panel 20, and outputs the auxiliary signal ARx to the sensing electrode 22. The auxiliary signal ARx refers to a signal for increasing the signal strength of the detection signal Rx including the inversion signal RTd illustrated in FIG. 1.

The control device 60 controls the whole display apparatus 10.

Each unit of such a display apparatus 10 is described.

Figure 3:
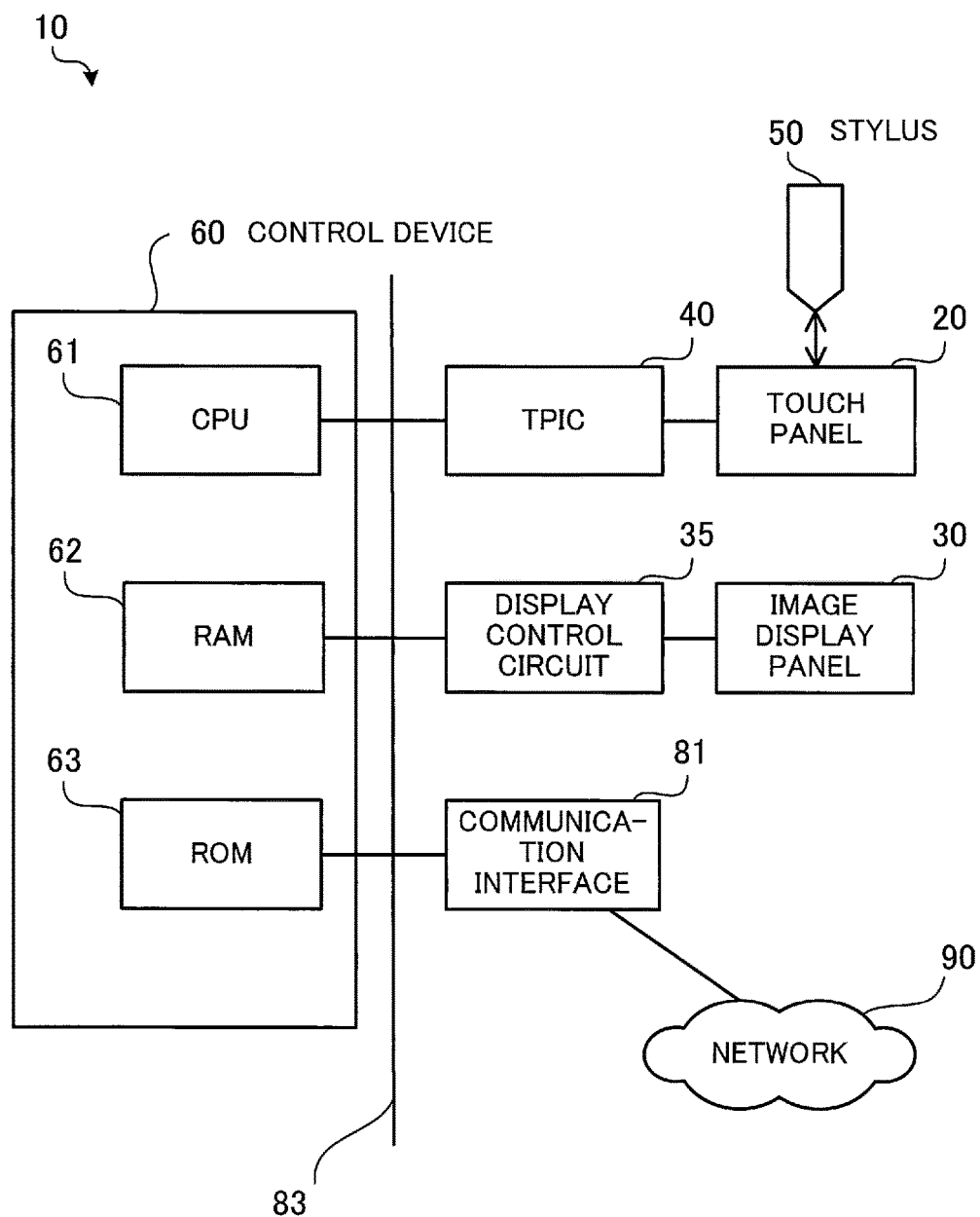
FIG. 3 illustrates an example of the configuration of a control device of the second embodiment.

First, the control device 60 configured to control the whole apparatus is described. FIG. 3 illustrates an example of the configuration of the control device of the second embodiment.

The control device 60 is controlled by a CPU (Central Processing Unit) 61. A RAM (Random Access Memory) 62, a ROM (Read Only Memory) 63, and a plurality of peripheral devices are connected or coupled to the CPU 61 via a bus 83.

The RAM 62 is used as the main storage device of the control device 60. At least part of the program of an OS (Operating System) and the application program executed by the CPU 61 are temporarily stored in the RAM 62. Moreover, various types of data needed for processing by the CPU 61 are stored in the RAM 62.

The ROM 63 is a nonvolatile semiconductor memory and used as a secondary storage device of the control device 60, and stores the information that need not to be updated. For example, the program of an OS, application programs, and various types of data are stored in the ROM 63. Note that a semiconductor memory, such as a flash memory, may be used as the secondary storage device.

The peripheral devices connected or coupled to the bus 83 include the display control circuit 35, the TPIC 40, and a communication interface 81.

The image display panel 30 is connected or coupled to the display control circuit 35.

The touch panel 20 is connected or coupled to the TPIC 40. The TPIC 40 detects a touch state of the stylus 50 based on an instruction of the CPU 61. Moreover, the TPIC 40 calculates the coordinate of a touch position, and outputs the touch information including the coordinate of a touch position to the CPU 61 via the bus 83.

The communication interface 81 is connected or coupled to a network 90, and transmits and receives data to and from another computer or telecommunication device via the network 90. Moreover, if the stylus 50 is connected or coupled to the network 90, the communication interface 81 may transmit and receive data to and from the stylus 50 via the network 90.

With such a configuration, the processing function of the control device 60 may be realized.

Figure 4:
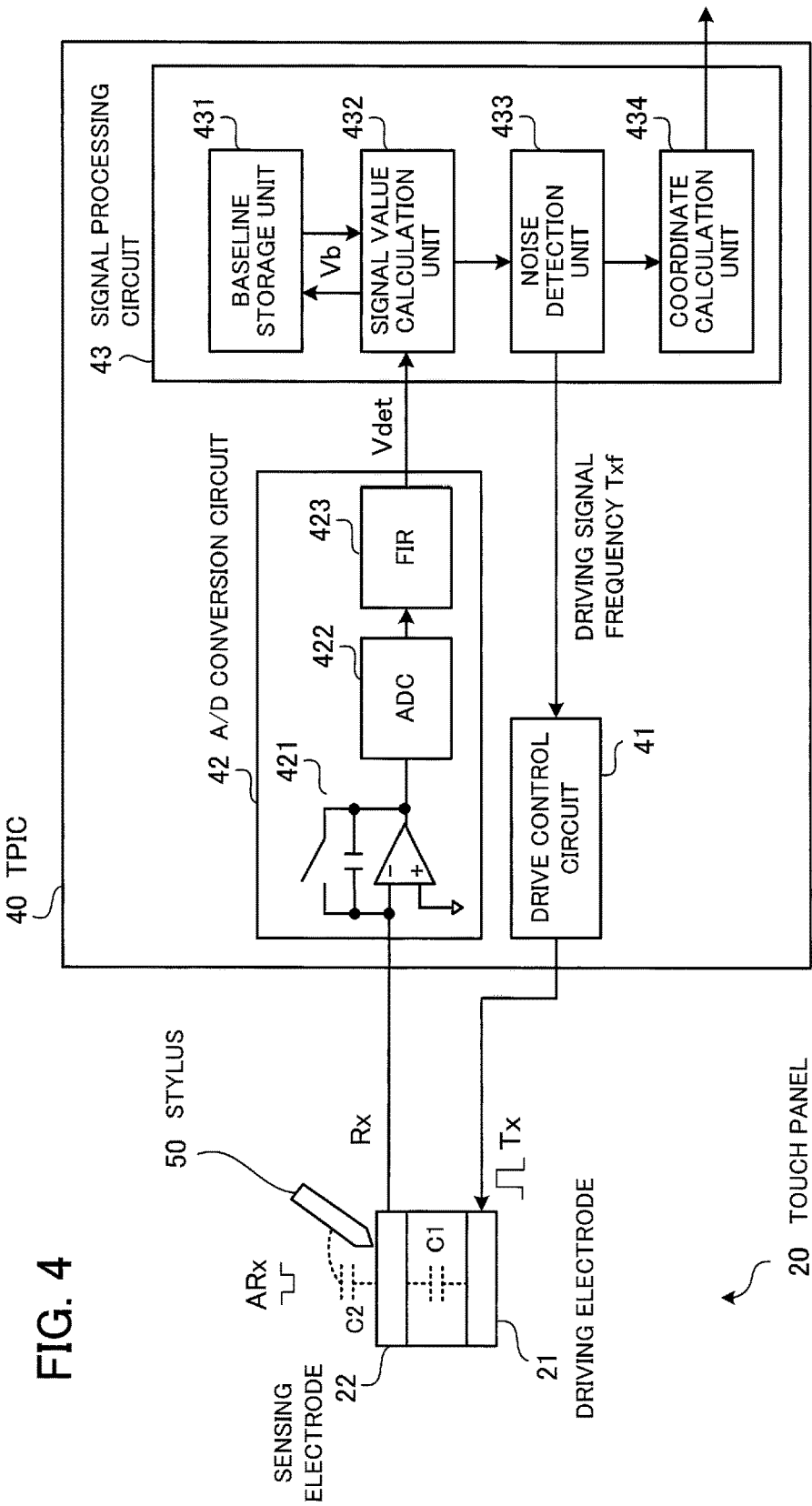
FIG. 4 illustrates an example of the configuration of a TPIC of the second embodiment.

Next, the configuration of the TPIC 40 is described. FIG. 4 illustrates an example of the configuration of the TPIC of the second embodiment. FIG. 4 illustrates the TPIC 40 and the outline of the cross section of a facing portion of the touch panel 20.

The TPIC 40 includes a drive control circuit 41, an A/D (analog/digital) conversion circuit 42, and a signal processing circuit 43, and performs a detection control to detect the touch of the stylus 50. Upon detection of a touch, the TPIC 40 detects the coordinate of a touch position and notifies the control device 60 of the coordinate. The drive control circuit 41 applies the driving signal Tx of an AC square waveform of a predetermined frequency to the driving electrode 21. The A/D conversion circuit 42 operates in synchronization with the drive control circuit 41, and receives the detection signal Rx in accordance with the mutual capacitance between the driving electrode and the sensing electrode and with the auxiliary signal ARx, and converts the detection signal Rx to the detection data Vdet. The A/D conversion circuit 42 is provided for each sensing electrode 22, and converts the detection signal Rx of the corresponding sensing electrode 22 to digital data. The signal processing circuit 43 receives the detection data Vdet converted by each A/D conversion circuit 42, and performs a procedure of detecting the touch of the stylus 50 and identifying the coordinate of a touch position of the stylus 50, based on the detection data Vdet across the whole touch surface.

Each processing unit is described following a signal flow.

In a period during which the driving electrode 21 to be shared as the common electrode of the image display panel 30 is not operating as the common electrode, within one frame period, the drive control circuit 41 sequentially applies the driving signal Tx to a plurality of driving electrodes 21. For example, the drive control circuit 41 selects the driving electrodes 21 illustrated in FIG. 2 in the order of #1, #2, #3, #4, and #5, . . . , and sequentially applies the driving signal Tx. The driving signal Tx is applied to each driving electrode 21 multiple times within one frame period. The driving signal Tx may be continuously applied to the selected driving electrode 21 multiple times.

In the touch panel 20, due to the driving signal Tx applied to the driving electrode 21, an electric current in accordance with the mutual capacitance between the driving electrode 21 and the sensing electrode 22 flows to the sensing electrode 22. As illustrated in FIG. 4, in the facing portion of the driving electrode 21 and sensing electrode 22, an electrostatic capacitance C1 (hereinafter, referred to as a capacitance C1) is formed by the driving electrode 21, the sensing electrode 22, and the dielectric substance therebetween. In the non-touch state of the stylus 50, when the driving signal Tx of an AC square waveform is applied to the driving electrode 21, an electric current in accordance with the capacitance C1 flows to the sensing electrode 22, and is output to the A/D conversion circuit 42 as the detection signal Rx. On the other hand, in the touch state of the stylus 50, a capacitance C2 formed between the stylus 50 and the sensing electrode 22 is added in series to the capacitance C1. Then, when the driving signal Tx of an AC square waveform is applied to the driving electrode 21, an electric field will be generated not only between the driving electrode and the sensing electrode but also between the driving electrode and the stylus. The electric field between the driving electrode and the sensing electrode decreases as compared with that in the non-touch state. Accordingly, the detection signal Rx0 has a value smaller than the value in the non-touch state. Furthermore, from the stylus 50, the auxiliary signal ARx generated by the detection assisting circuit 51 is output to the sensing electrode 22. As a result, the detection signal Rx, whose signal change has been strengthened by superimposing the signal component of the auxiliary signal ARx on the detection signal Rx0, is obtained. As described above, the auxiliary signal ARx output from the stylus 50 strengthens the signal change of the detection signal Rx due to the capacitance, which the stylus 50 forms between the stylus 50 and the driving electrodes 21, thereby making more noticeable a difference between the detection signal Rx in the touch state and the detection signal Rx in the non-touch state. The detection signal Rx is generated in a plurality of sensing electrodes 22, respectively, and is output to the A/D conversion circuit 42.

The A/D conversion circuit 42 includes an integration circuit 421, an ADC (Analog to Digital Converter) 422, and an FIR (Finite Impulse Response) 423, and extracts the detection signal Rx in synchronization with the drive control circuit 41, and generates, from the detection signal Rx, the detection data Vdet to be used in the signal processing circuit 43. Note that only one A/D conversion circuit 42 is illustrated in FIG. 4, but the A/D conversion circuit 42 is provided corresponding to each of a plurality of sensing electrodes 22. Alternatively, a plurality of sensing electrodes 22 and the A/D conversion circuit 42 may be connected, for example, via a multiplexer, so that the sensing electrode 22, from which the detection signal is received, may be sequentially switched in accordance with the driving electrode 21 selected by the drive control circuit 41.

The integration circuit 421 outputs a voltage value obtained by integrating the detection signal Rx. In the non-touch state of the stylus 50, when the driving signal is applied to the driving electrode 21, an electric current flows in a path from the driving electrode 21 to the capacitance of the integration circuit 421 through the capacitance C1 and the sensing electrode 22, so that the output voltage of the integration circuit 421 decreases. In contrast, in the touch state of the stylus 50, the capacitance between the driving electrode and the sensing electrode decreases and also the output signal of the stylus 50 is added, so that the electric current flowing into the integration circuit 421 decreases to cause a difference in the output voltage drop of the integration circuit 421.

Figure 5:
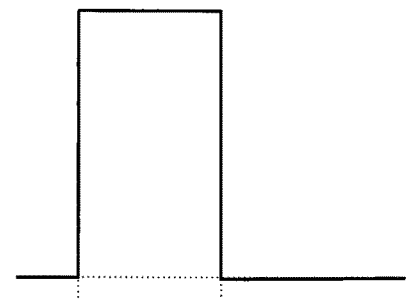
FIG. 5 illustrates an example of the output signal of an integration circuit in response to a driving signal.
Figure 5:
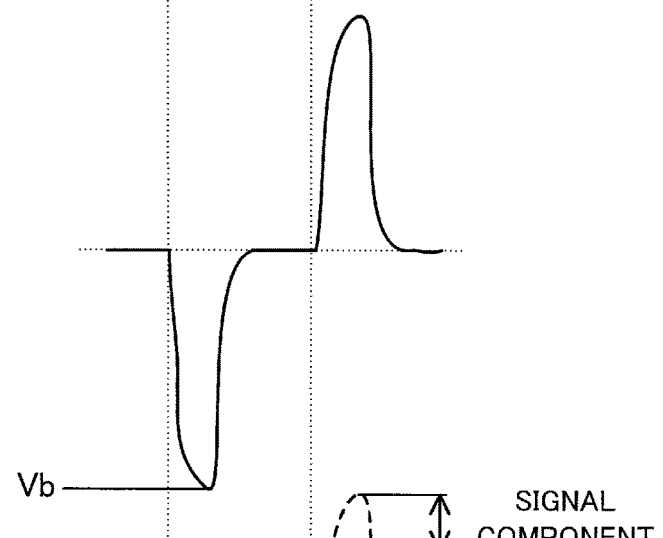
Figure 5:
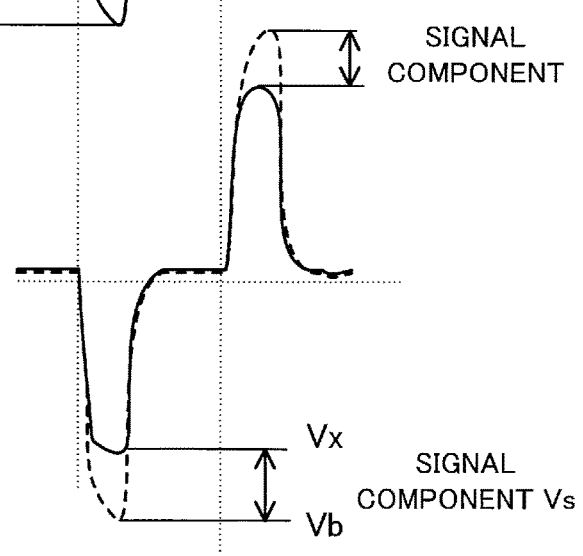

FIG. 5 illustrates an example of the output signal of the integration circuit in response to the driving signal.

(A) illustrates the waveform in one clock interval of the AC square waveform of the driving signal Tx. (B) illustrates the waveform of the output voltage of the integration circuit when the stylus 50 is in the non-touch state. (C) illustrates the waveform of the output voltage of the integration circuit when the stylus 50 is in the touch state. Both (B) and (C) correspond to one clock interval of (A).

As illustrated in FIG. 5, in the rising edge of the driving signal Tx, an electric current flows in the path from the driving electrode 21 to the capacitance of the integration circuit 421 through the mutual capacitance and sensing electrode 22, so that the output voltage of the integration circuit 421 drops. In the falling edge of the driving signal Tx, the output voltage of the integration circuit 421 rises.

Here, the maximum value in the negative direction of the output voltage of the integration circuit when the stylus 50 is in the non-touch state illustrated in (B) is defined as a baseline Vb. Similarly, the maximum value in the negative direction of the output voltage of the integration circuit when the stylus 50 is in the touch state illustrated in (C) is defined as a baseline Vx. As described above, the magnitude of the mutual capacitance is larger in the non-touch state than in the touch state, and furthermore in the touch state, the auxiliary signal ARx whose phase is opposite to the phase of the driving signal is output from the stylus 50 to the sensing electrode 22. Accordingly, the difference between the baseline Vb in the non-touch state and the baseline Vx in the touch state is large enough to be used in determining whether the state is the touch state or the non-touch state. In the second embodiment, whether the state is the touch state or the non-touch state is determined, based on a difference (a signal component Vs in FIG. 5) in the output voltage of the integration circuit between the touch state and the non-touch state. Note that, as illustrated in FIG. 5, also when the driving signal falls, the signal component may be similarly detected.

Returning to FIG. 4, the description continues.

The ADC 422 includes a sample/hold circuit, and samples/holds the peak value of a signal that has been integrated by the integration circuit 421, and A/D-converts the sampled/held peak value to a digital signal. With the ADC 422, Vb in the non-touch state and Vx in the touch state illustrated in FIG. 5 are calculated.

The FIR 423 performs an averaging process to reduce unwanted noise included in the signal generated by the ADC 422.

In this manner, in the A/D conversion circuit 42, the detection data Vdet is generated based on the detection signal Rx that is output from the sensing electrode 22 when the driving signal Tx is applied to the driving electrode 21. The detection data Vdet indicates the mutual capacitance between the driving electrode and the sensing electrode at that time point. The magnitude of the mutual capacitance is larger in the non-touch state than in the touch state. Accordingly, the magnitude of the detection data Vdet differs between the non-touch state and the touch state. The measured detection data Vdet is output to the signal processing circuit 43.

The drive control circuit 41 applies the driving signal Tx selectively to the driving electrode 21. In the A/D conversion circuit 42, the detection data Vdet is generated in all the sensing electrodes 22 in synchronization with the application of the driving signal Tx. The above-described procedure is performed on all the driving electrodes 21 to generate the detection data Vdet of all the facing portions formed in the touch panel 20.

The signal processing circuit 43 includes a baseline storage unit 431, a signal value calculation unit 432, a noise detection unit 433, and a coordinate calculation unit 434. The detection data Vdet of all the facing portions where the driving electrode 21 and the sensing electrode 22 face each other are input to the signal processing circuit 43.

The baseline storage unit 431 stores, as the baseline Vb, the detection data Vdet of the A/D conversion circuit 42 when the stylus 50 is in the non-touch state. The baseline Vb is appropriately updated by the signal calculation unit 432.

Based on the detection data Vdet obtained from the A/D conversion circuit 42 and on the baseline Vb stored in the baseline storage unit 431, the signal value calculation unit 432 calculates the signal component Vs due to the presence of the stylus 50 included in the detection data Vdet and determines whether the stylus 50 is in the touch state or in the non-touch state. Specifically, the signal value calculation unit 432 calculates a difference (Vdet−Vb) between the detection data Vdet obtained from the A/D conversion circuit 42 and the baseline Vb, and compares the calculated signal value Vs with a threshold. If the signal value Vs is equal to or less than the threshold, the signal value calculation unit 432 determines that the stylus 50 is in the non-touch state. If the signal value Vs exceeds the threshold, the signal value calculation unit 432 determines that the stylus 50 is in the touch state. Moreover, when the signal value calculation unit 432 determines that the stylus 50 is in the non-touch state, the baseline Vb may be updated with the value of the detection data Vdet at this time. Appropriate updating of the baseline Vb also allows responding to the case where the baseline value has shifted due to a change or the like of the operating environment, and allows an accurate touch detection to be performed.

The noise detection unit 433 analyzes the signal value Vs in the touch surface area that is calculated by the signal value calculation unit 432, and determines whether or not noise is included in the signal value Vs in the touch surface area. For example, the noise detection unit 433 compares an assumed noise pattern of an AC charger noise or the like with the signal value Vs in the touch surface area to determine whether or not the noise pattern has been detected. When noise is detected, the drive control circuit 41 may be instructed to change the frequency of the driving signal Tx.

When the calculated signal value Vs indicates the touch state, the coordinate calculation unit 434 detects a position coordinate indicative of the touch state. Using the signal value Vs (=Vdet−Vb) of a signal whose noise has been removed by the noise detection unit 433, a distribution state of the facing portions indicative of the touch state is analyzed to determine the position coordinate. The method for determining a position coordinate is appropriately selected in accordance with the operating state or the like. For example, the center of gravity of an area where facing portions indicate the touch state may be calculated and set as the position coordinate. Alternatively, the position coordinate may be determined based on a signal whose calculated signal value Vs is higher. Moreover, as needed, a tracking process to associate the detected position coordinate with the previously detected position coordinate may be performed. The presence or absence of touch and the position coordinate of the touch are output to the control device 60 as the touch information.

Note that, in the second embodiment, the signal processing circuit 43 is provided inside the TPIC 40, but a similar procedure may be performed by the control device 60. Moreover, a part of the procedure of the signal processing circuit 43 may be performed by the control device 60.

Figure 6:
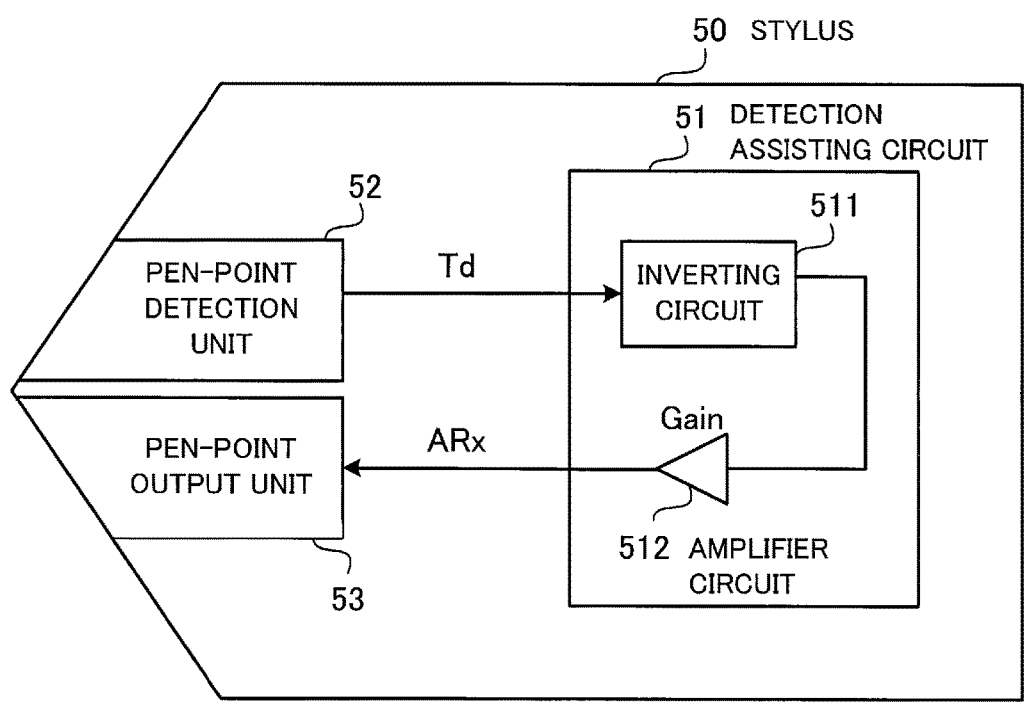
FIG. 6 illustrates an example of the configuration of a stylus of the second embodiment.

Next, the stylus is described. FIG. 6 illustrates an example of the configuration of the stylus of the second embodiment.

The stylus 50 includes a detection assisting circuit 51, a pen-point detection unit 52, and a pen-point output unit 53.

The detection assisting circuit 51 includes an inverting circuit 511 and an amplifier circuit 512. The inverting circuit 511 inverts an electric potential change of the detection driving signal Td input from the pen-point detection unit 52 to generate an inversion signal. The amplifier circuit 512 generates an amplified inversion signal by amplifying the inversion signal input from the inverting circuit 511 by a predetermined gain, and outputs the amplified inversion signal to the pen-point output unit 53 as the auxiliary signal ARx.

The pen-point detection unit 52 is formed at a tip part of the stylus 50 that is pointed to the touch panel 20. Then, the pen-point detection unit 52 detects an electric potential change of the driving signal Tx applied to the driving electrode 21 and outputs the detection driving signal Td to the inverting circuit 511.

The pen-point output unit 53 is formed at a tip part of the stylus 50, as with the pen-point detection unit 52. Then, the pen-point output unit 53 outputs the auxiliary signal ARx generated by the amplifier circuit 512 to the sensing electrode 22.

In the stylus 50 of such a configuration, when the stylus 50 approaches the touch panel 20, an electric potential change of the driving signal Tx of the touch panel 20 is detected via the pen-point detection unit 52. If the distance between the stylus 50 and the sensing electrode 22 is the same, the signal level of the detected detection driving signal Td is determined in accordance with the distance between the sensing electrode 22 and the driving electrode 21 which the driving signal Tx is applied to. For example, assume that among the driving electrodes 21 of #1 to #5 illustrated in FIG. 2, the stylus 50 is proximate to #3. As the driving signal Tx is applied sequentially from #1, the potential level of the detection driving signal Td detected by the stylus 50 becomes the maximum when the driving signal Tx is applied to #3, and as the position where the driving signal Tx is applied departs from #3, the potential level decreases. In the stylus 50, the auxiliary signal ARx obtained by inverting and amplifying the detected electric potential change by the detection assisting circuit 51 is output from the pen-point output unit 53. Accordingly, the auxiliary signal ARx weakly assists the signal to change when the driving signal Tx is applied to a place away from the stylus 50, while when the driving signal Tx is applied to a place proximate to the stylus 50, the auxiliary signal ARx strongly assists the signal to change. Therefore, the signal strength of the detection signal Rx may be increased.

As described above, in the display apparatus 10, the use of such a stylus 50 for the manipulation input in the mutual capacitance type touch panel 20 allows the signal strength of the detection signal Rx to be increased. As a result, a difference in the signal change between the touch state and the non-touch state increases, and therefore even the stylus 50 with a small contact area may reliably detect the presence or absence of touch. Moreover, because the signal strength is increased in the driving electrode 21 closer to a touch position, the touch position may be more reliably detected. In particular, in the case of the in-cell type touch panel, because the distance between the driving electrode 21 and the sensing electrode 22 increases, the magnitude of the driving signal Tx reaching the sensing electrode 22 decreases to make the touch detection difficult. However, because the display apparatus 10 allows the signal strength to be increased, even an in-cell type touch panel may reliably detect a touch.

Note that the gain of the amplifier circuit 512 is appropriately set so that the potential level of the auxiliary signal ARx becomes the optimum. Moreover, the gain setting of the amplifier circuit 512 may be switched depending on whether or not the stylus 50 is in contact with a touch surface. For example, a pressure detection mechanism is provided in the pen-point detection unit 52 to detect whether or not the pen point of the stylus 50 is in contact with the touch surface. Between when a current flowing when the pen-point detection unit 52 is in contact with the touch surface is detected and when the pen-point detection unit 52 is up in the air of the touch surface, the gain of the amplifier circuit 512 is switched to change the amplification level, thereby controlling the pointing input when the pen-point detection unit 52 is up in the air of the touch surface. Once the gain when the pen-point detection unit 52 is up in the air of the touch surface is reduced, the pointing input is not allowed if the stylus 50 is not in contact with the touch surface, thereby preventing a wrong input. On the other hand, if the gain is increased, the pointing input when the pen-point detection unit 52 is up in the air of the touch surface may be reliably performed.

Because the driving signal Tx applied to the driving electrode 21 is input to the stylus 50 through the path from the dielectric substance to the capacitance between the stylus and the sensing electrode through the sensing electrode 22, noise may mix into the detection driving signal Td midway along the path. For example, noise, i.e., the so-called AC charger noise, which is generated from a low-cost charger when the charger is connected to the display apparatus 10, might be added.

Figure 7A:
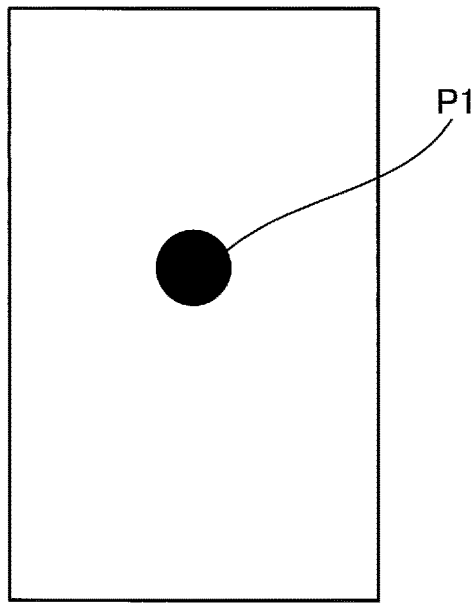
FIGS. 7A and 7B illustrate an example of a noise pattern.
Figure 7B:
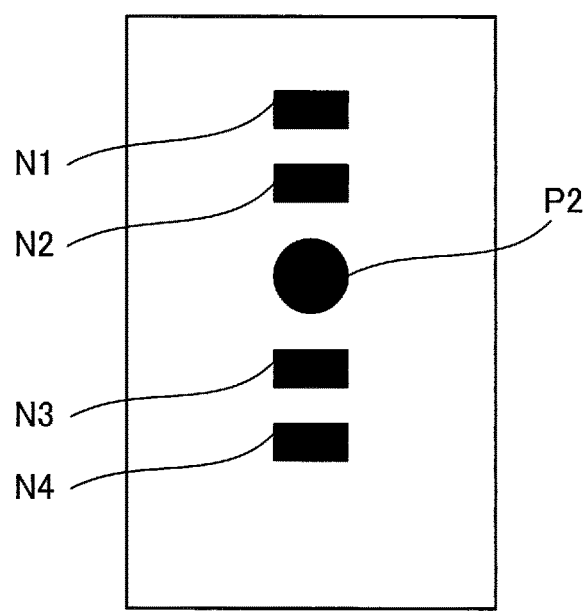

FIGS. 7A and 7B illustrate an example of the noise pattern.

A black area illustrated in FIGS. 7A and 7B indicates a place where the touch of the stylus 50 is detected. Both the example of a pattern without noise of FIG. 7A and the example of a pattern with noise of FIG. 7B illustrate the case where the stylus 50 touches the same position of the touch panel 20.

In the case without noise illustrated in the example of the pattern without noise of FIG. 7A, touch is detected only at one area P1. The area P1 is the place touched by the stylus 50. In the case of such a pattern, the coordinate of a touch position may be easily calculated.

In contrast, in the case with noise illustrated in the example of the pattern with noise of FIG. 7B, touch is detected at a plurality of areas N1, N2, N3, and N4 around an area P2. The area P2 is the place touched by the stylus 50, and the areas N1, N2, N3, and N4 are noises. In the state where such a pattern is generated, the detection accuracy of a touch position will decrease.

Then, in the display apparatus 10, the signal processing circuit 43 performs a procedure of analyzing the signal value Vs obtained from the detection signal Rx, detecting noise, and reducing the noise.

The noise detection unit 433 compares the touch information across the whole touch surface of the touch panel 20 obtained from the signal value calculation unit 432 with a predicted noise pattern of an AC charger noise or the like to determine whether or not noise is generated. In this connection, one or more noise patterns are predicted, and the noise detection unit 433 compares the touch information with each of these noise patterns. When the noise detection unit 433 determines that noise is generated, then in order to prevent a reduction of the touch position detection accuracy due to such noise, the display apparatus 10 switches the frequency of the driving signal Tx and notifies the drive control circuit 41 of a new driving signal frequency Txf. If the frequency of a periodically generated noise, such as an AC charger noise, is close to the frequency of the driving signal Tx, the noise will be superposed on the detection signal Rx. Then, by switching the frequency of the driving signal Tx to a frequency different from the frequency of the AC charger noise, the driving signal may be distinguished from the noise and the noise superposed on the detection signal Rx may be reduced.

Figure 8:
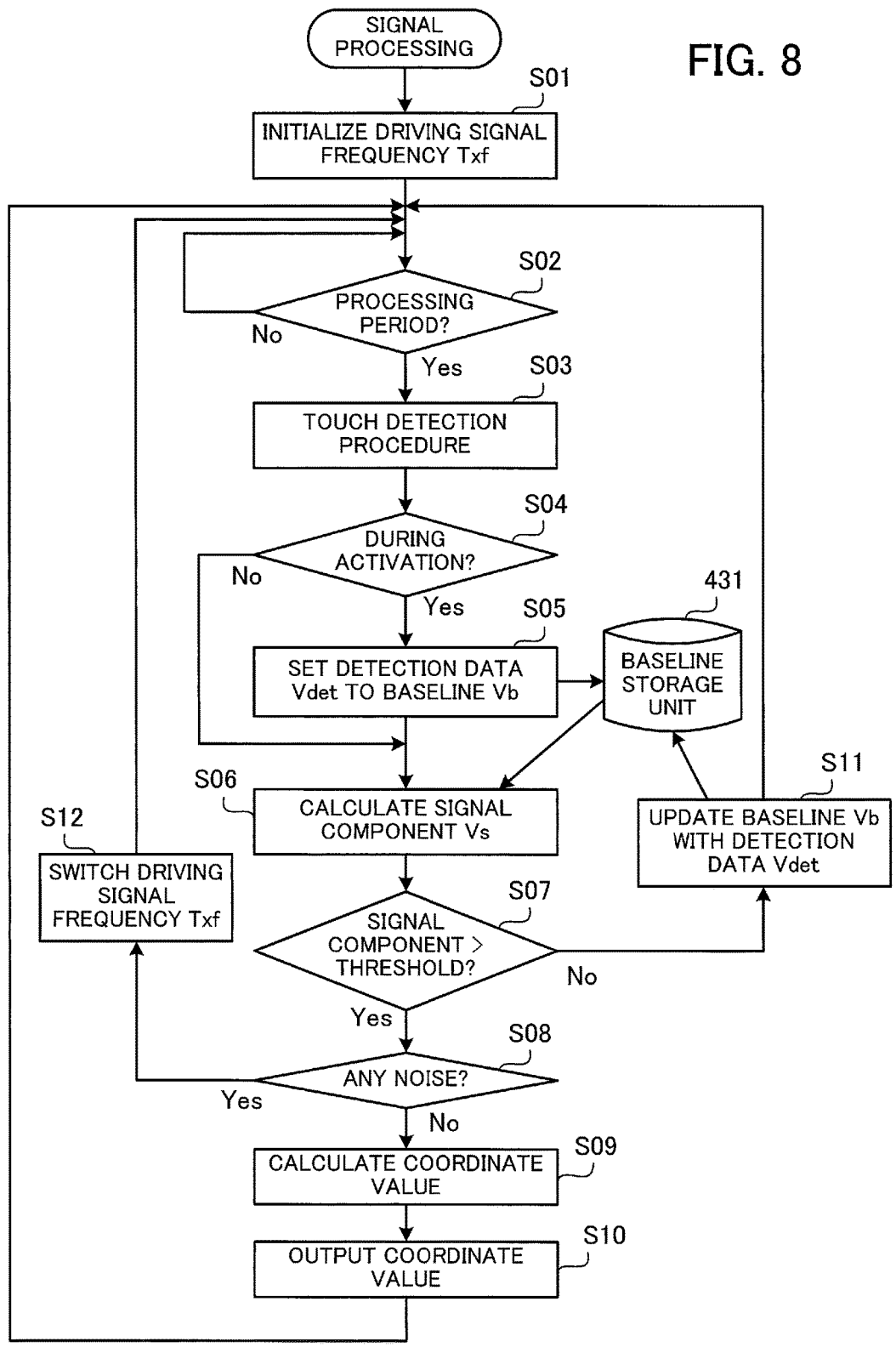
FIG. 8 is a flow chart illustrating a touch detection procedure of the display apparatus of the second embodiment.

A touch detection procedure in the display apparatus 10 of such a configuration is described using a flow chart. FIG. 8 is a flow chart illustrating the touch detection procedure of the display apparatus of the second embodiment. The display apparatus 10 starts to operate and activates the touch detection procedure to start the processing by the TPIC 40.

(Step S01) During activation, the TPIC 40 sets the driving signal frequency Txf to a predetermined initial value to initialize the frequency of the driving signal Tx.

(Step S02) The TPIC 40 determines whether or not the current period is the processing period for performing the touch detection. The touch detection is performed in a period during which the driving electrode 21 is not operating as the common electrode for display. If the current period is the processing period, the procedure proceeds to step S03. If the current period is not the processing period, the procedure waits till the next processing period starts.

(Step S03) Because the current period is the processing period, the TPIC 40 performs the touch detection procedure. In the touch detection procedure, the driving signal Tx is sequentially applied to the driving electrode 21 by the drive control circuit 41, and the detection signal Rx is received from the sensing electrode 22. The received detection signal Rx is converted to the detection data Vdet by the A/D conversion circuit 42. In the touch detection procedure, the detection data Vdet in all the facing portions where the driving electrode 21 and the sensing electrode 22 cross each other are obtained.

(Step S04) The TPIC 40 determines whether or not the current touch detection procedure is the procedure during activation. If the current procedure is the procedure during activation, the procedure proceeds to step S05. If the current procedure is not the procedure during activation, the procedure proceeds to step S06.

(Step S05) Because the current procedure is the procedure during activation, the TPIC 40 sets the value of the detection data Vdet to the baseline Vb and stores the value into the baseline storage unit 431. The detection data Vdet, by which the stylus 50 is assumed to be in the non-touch state, is set to the baseline Vb.

(Step S06) The TPIC 40 calculates the signal component Vs using the baseline Vb stored in the baseline storage unit 431 and the detection data Vdet obtained through the touch detection procedure. The signal component Vs is obtained by calculating a difference (Vs=Vdet−Vb) between the detection data Vdet and the baseline Vb.

(Step S07) The TPIC 40 compares the calculated signal component Vs with a threshold. The comparison between the signal component Vs and the threshold is performed on all the signal components Vs calculated for each facing portion. When there is any signal component Vs satisfying "the signal component Vs>the threshold", the procedure proceeds to step S08. When there is not any signal component Vs satisfying "the signal component Vs>the threshold", the procedure proceeds to step S11.

(Step S08) When the signal component Vs is larger than the threshold, the TPIC 40 collates the obtained detection data Vdet with a pre-registered noise pattern to determine whether or not noise is included in the detection data Vdet. When the TPIC 40 determines that there is noise, the procedure proceeds to step S12. When the TPIC 40 determines that there is no noise, the procedure proceeds to step S09.

(Step S09) When having determined that there is no noise, the TPIC 40 calculates the coordinate value of the touch position based on the signal component Vs.

(Step S10) The TPIC 40 outputs the calculated coordinate value of the touch position to the control device 60 and then the procedure proceeds to step S02.

(Step S11) When the signal component Vs is less than the threshold, the TPIC 40 determines that the detection data Vdet indicates the non-touch state. The TPIC 40 updates the baseline storage unit 431 with new detection data Vdet as the baseline Vb, and the procedure proceeds to step S02.

(Step S12) When having determined that there is noise, the TPIC 40 switches the frequency (driving signal frequency Txf) of the driving signal Tx to a frequency of a different value in order to reduce noise, and the procedure proceeds to step S02.

By executing the above procedure, the TPIC 40 detects that the stylus 50 has touched the touch panel 20 and obtains the coordinate value of the touched position. In the state where the stylus 50 is in touch with the touch panel 20, because the auxiliary signal ARx whose phase is opposite to the phase of the driving signal Tx is output to the sensing electrode 22 from the stylus 50, the signal component Vs has a large value as compared with the case where the stylus 50 does not output the auxiliary signal ARx. Therefore, the presence or absence of touch may be reliably detected.

Moreover, when a noise pattern is detected in the obtained signal component Vs, the frequency of the driving signal Tx is switched so as to reduce noise. As a result, the influence from noise, such as an AC charger noise, may be reduced.

Note that, in the above, a case has been described, where an input operation is performed on the touch panel 20 using the stylus 50. However, the touch panel 20 is a mutual capacitance type touch panel, and therefore the touch panel 20 may be naturally manipulated with a finger in contact with or proximate to the touch surface. In this case, because a finger may secure a sufficient contact area in the touch surface, the presence or absence of touch may be reliably detected even if the auxiliary signal ARx is not output to the sensing electrode 22.

Third Embodiment

In the second embodiment, in order to reduce noise, such as an AC charger noise, the driving signal frequency Txf is switched by the TPIC 40 when a noise pattern is detected. In a third embodiment, furthermore a procedure of reducing noise is performed in the stylus 50.

Hereinafter, a display apparatus of the third embodiment is described using FIG. 9. In the third embodiment, the detection assisting circuit 51 of the stylus 50 of the second embodiment is replaced with a new configuration. Because other configurations are the same as those of the second embodiment, only a new detection assisting circuit is described.

Figure 9:
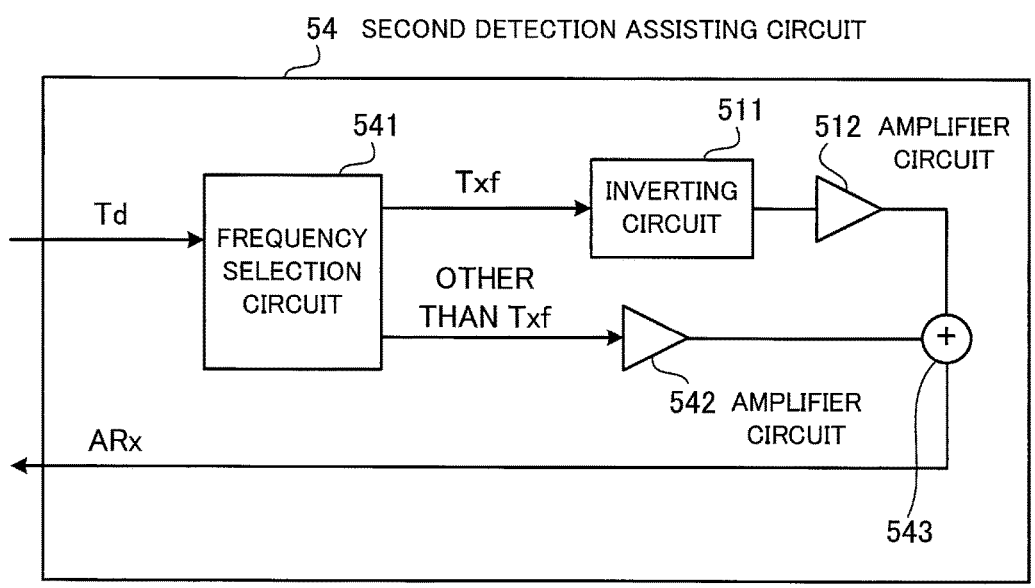
FIG. 9 illustrates an example of the configuration of a second detection assisting circuit of a display apparatus of a third embodiment.

FIG. 9 illustrates an example of the configuration of a second detection assisting circuit of a display apparatus of the third embodiment.

A second detection assisting circuit 54 of the third embodiment is a replacement of the detection assisting circuit 51 of the second embodiment. The same number is attached to the same element as the detection assisting circuit 51 to omit the description thereof.

The second detection assisting circuit 54 includes a frequency selection circuit 541, an inverting circuit 511, an amplifier circuit 512, an amplifier circuit 542, and an adder (adder circuit) 543.

The frequency selection circuit 541 selects the output destination for each signal component according to whether the frequency of a signal component included in the input detection driving signal Td is the driving signal frequency Txf or another frequency. The signal component includes, first of all, a signal component corresponding to the driving signal Tx included in the detection driving signal Td. When there is no noise generated, the signal component included in the detection driving signal Td includes only the signal component corresponding to the driving signal Tx. The signal component whose frequency matches the driving signal frequency Txf is referred to as a first signal, for convenience. When there is any noise generated, the detection driving signal Td includes a noise component in addition to the first signal. The signal including noise has a frequency different from the driving signal frequency Txf. The signal including noise is referred to as a second signal. Based on such a difference in frequency, the frequency selection circuit 541 sorts the signal components of the detection driving signal Td in accordance with the frequency, and outputs the first signal to the inverting circuit 511 and outputs the second signal to the amplifier circuit 542.

The inverting circuit 511 and amplifier circuit 512 invert and amplify an electric potential change of the first signal included in the received detection driving signal Td and then output the resulting electric potential change to the adder 543.

The amplifier circuit 542 amplifies an electric potential change of the second signal included in the input detection driving signal Td as it is, and then outputs the resulting electric potential change to the adder 543. The signal component whose electric potential change is amplified as it is will serve, when output to the sensing electrode 22, as a correction signal for reducing the noise included in the driving signal Tx.

The adder 543 adds the first inversion signal obtained by inverting a phase of the first signal received via the amplifier circuit 512, and the correction signal received via the amplifier circuit 542 to generate a correction inversion signal, and outputs the correction inversion signal from the pen-point output unit 53 as the auxiliary signal ARx.

In such a second detection assisting circuit 54, the frequency selection circuit 541 separates a signal component of the first signal included in the detection driving signal Td from a signal component of the second signal included in the detection driving signal Td. The first signal of the same frequency as that of the driving signal Tx is inverted and amplified by the inverting circuit 511 and amplifier circuit 512 to generate the first inversion signal. On the other hand, the second signal that is a noise component is amplified by the amplifier circuit 542, without being inverted, to generate the correction signal for correcting a noise component included in the detection signal Rx. The adder 543 adds the first inversion signal and the correction signal to generate a correction inversion signal, and outputs the correction inversion signal to the sensing electrode 22 as the auxiliary signal ARx. Such an auxiliary signal ARx is output to the sensing electrode 22, so that the strength of a signal component related to touch detection included in the detection signal Rx may be increased to reduce the noise component.

As a result, the presence or absence of touch may be reliably detected under noisy environments.

Note that, as illustrated in FIG. 8, when a configuration is employed, in which the driving signal frequency Txf is switched when noise is detected, the frequency selection circuit 541 needs to notify the stylus 50 side from the TPIC 40 side of the driving signal frequency Txf when noise is detected. A configuration is described, in which the second detection assisting circuit 54 is provided with a function to provide the notification of the driving signal frequency Txf.

Figure 10:
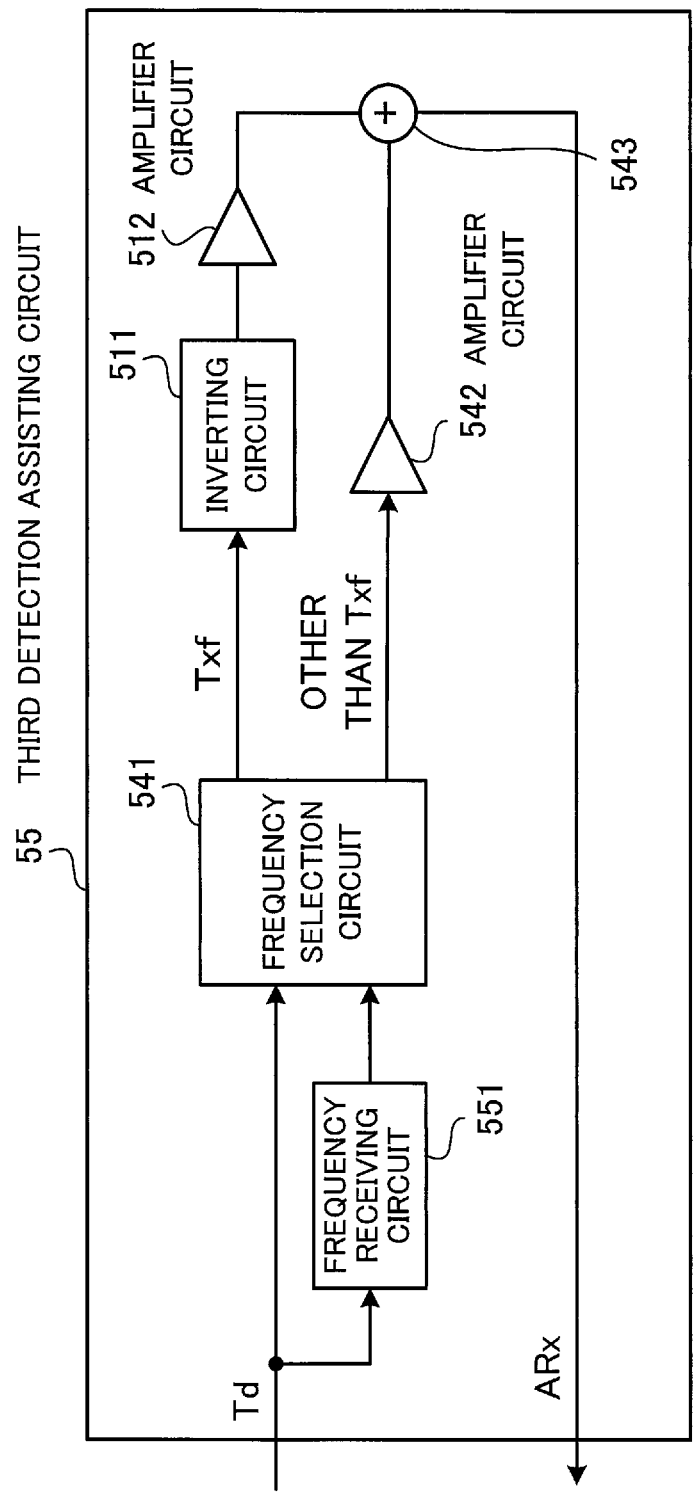
FIG. 10 illustrates an example of the configuration of a third detection assisting circuit.

FIG. 10 illustrates an example of the configuration of a third detection assisting circuit.

A third detection assisting circuit 55 illustrated in FIG. 10 has a configuration, in which a frequency receiving circuit 551 is added to the second detection assisting circuit 54. The frequency receiving circuit 551 receives the detection driving signal Td, separates the notification of the driving signal frequency Txf included in the detection driving signal Td, from the detection driving signal Td. Then, the frequency receiving circuit 551 notifies the frequency selection circuit 541 of the obtained driving signal frequency Txf. In the frequency selection circuit 541, the notified driving signal frequency Txf is stored into a storage unit and is referred to when the component of the detection driving signal Td is separated in accordance with frequency.

On the TPIC 40 side, the drive control circuit 41 that obtained the new driving signal frequency Txf from the noise detection unit 433 switches the driving signal frequency Txf, and superimposes the notification of the switched driving signal frequency Txf onto the driving signal Tx and outputs the resulting driving signal Tx.

The notification of the driving signal frequency Txf is performed continuously after the initialization of the driving signal frequency Txf of step S01 and after the switching of the driving signal frequency Txf of step S12, for example, in the signal processing procedure illustrated in FIG. 8. Moreover, for the purpose of notification of the driving signal frequency Txf, data communication may be performed in a period during which the touch detection is not being performed via the driving electrode 21 or sensing electrode 22. The notification of the driving signal frequency Txf superposed on the driving signal Tx is input from the pen-point detection unit 52 to the third detection assisting circuit 55 through the driving electrode 21, the first capacitance, and the sensing electrode 22 when the stylus 50 approaches the sensing electrode 22.

Note that the method for transferring the driving signal frequency Txf from the TPIC 40 to the stylus 50 is not limited to the method performed via the detection driving signal Td between the sensing electrode 22 and the stylus 50, but may be performed via the communication interface 81, for example.

Fourth Embodiment

In the second embodiment and the third embodiment, a phase delay due to the signal processing inside the stylus 50 is assumed to be negligible. For example, in the second embodiment, the detection driving signal Td detected by the pen-point detection unit 52 is inverted by the inverting circuit 511 and amplified by the amplifier circuit 512 and serves as the auxiliary signal ARx, and is then just output from the pen-point output unit 53, and therefore there may be almost no phase delay generated inside the stylus 50. Accordingly, a phase difference between a signal component corresponding to the mutual capacitance between the driving electrode and the sensing electrode, the signal component being detected by the sensing electrode 22 in synchronization with a signal detected by the pen-point detection unit 52, and the auxiliary signal ARx may be negligible.

However, when the phase delay inside the stylus 50 increases, the phase difference between a signal component included in the detection signal Rx and detected by the sensing electrode 22, corresponding to the mutual capacitance between the driving electrode and the sensing electrode, and a signal component of the auxiliary signal ARx increases, which may cause a malfunction in the TPIC 40 that uses the detection signal Rx.

In the fourth embodiment, the detection assisting circuit 51 of the first embodiment includes a circuit for aligning the phase of the auxiliary signal ARx output from the pen-point output unit 53 with the phase of the detection driving signal Td of the pen-point detection unit 52.

Hereinafter, a display apparatus of the fourth embodiment is described using FIG. 11.

Figure 11:
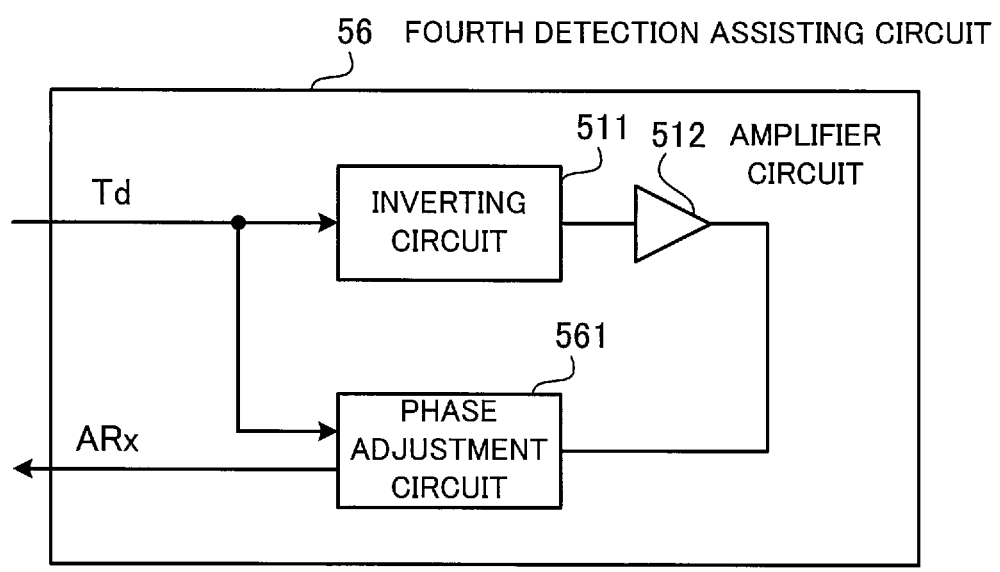
FIG. 11 illustrates an example of the configuration of a fourth detection assisting circuit of a display apparatus of a fourth embodiment.

FIG. 11 illustrates an example of the configuration of the fourth detection assisting circuit of the display apparatus of the fourth embodiment.

A fourth detection assisting circuit 56 illustrated in FIG. 11 has a configuration, in which a phase adjustment circuit 561 is added to the detection assisting circuit 51 illustrated in FIG. 6. The description of the same element as that of the detection assisting circuit 51 is omitted.

The phase adjustment circuit 561 receives the detection driving signal Td input from the pen-point detection unit 52 and the auxiliary signal ARx output by the amplifier circuit 512, and monitors the phase delay of the auxiliary signal ARx relative to the detection driving signal Td. Then, when the amount of phase delay exceeds a predetermined amount, the phase adjustment circuit 561 adjusts to align the phase of the auxiliary signal ARx with the phase of the detection driving signal Td. The phase of the auxiliary signal ARx is shifted to align the edge of the waveform thereof with the edge of the next detection driving signal Td. When the amount of phase delay does not exceed a predetermined amount, the phase of the auxiliary signal ARx is output as it is without being shifted.

Figure 12:
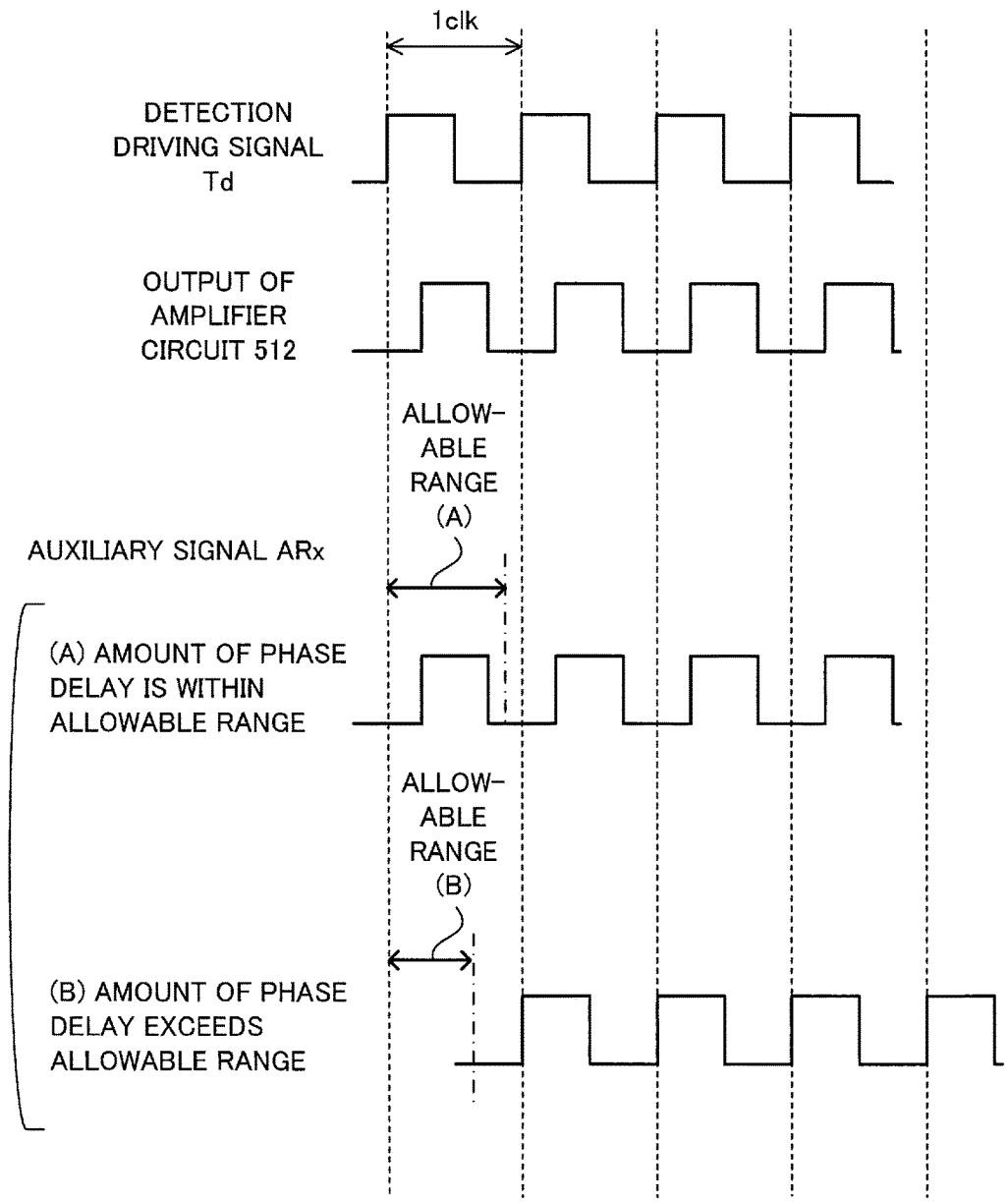
FIG. 12 illustrates a relationship between an input signal and an output signal of a phase adjustment circuit.

FIG. 12 illustrates a relationship between the input signal and output signal of the phase adjustment circuit. 1 clk indicates one period of the detection driving signal Td.

As illustrated in FIG. 12, the output of the amplifier circuit 512 has a phase delay relative to the detection driving signal Td. An allowable range of the phase delay is set to the phase adjustment circuit 561 in advance, and whether or not to align the phase of the auxiliary signal ARx with the phase of the detection driving signal Td is determined based on the allowable range.

In (A) of FIG. 12, an output whose phase delay is within an allowable range indicates the output of the phase adjustment circuit 561 when the phase of the output signal of the amplifier circuit 512 is within an allowable range (A). Because the phase delay is within the allowable range (A), the output of the amplifier circuit 512 is output without delaying the phase thereof, as it is, as the auxiliary signal ARx.

In (B) of FIG. 12, an output whose phase delay exceeds an allowable range indicates the output of the phase adjustment circuit 561 when the phase of the output signal of the amplifier circuit 512 exceeds an allowable range (B). Because the phase delay exceeds the allowable range (B), the phase of the output of the amplifier circuit 512 is delayed in align with the edge of the detection driving signal Td after 1 clk, and is then output as the auxiliary signal ARx.

As described above, the phase adjustment circuit 561 is provided and the phase of the auxiliary signal ARx is aligned with the phase of the detection driving signal Td, so that the phase of the auxiliary signal ARx synchronizes with the phase of a signal component corresponding to the mutual capacitance between the driving electrode and the sensing electrode in the sensing electrode 22. As a result, the malfunctions in the TPIC 40 due to a phase delay of the auxiliary signal ARx may be reduced.

Note that, in the fourth embodiment, a phase delay is detected and the phase is shifted, but the phase of the auxiliary signal ARx may be always delayed in align with the edge of the next detection driving signal Td.

Note that the above-described processing functions may be implemented on a computer. In that case, a program describing the processing content of a function which each display apparatus needs to have is provided. A computer system executes those programs, thereby providing the above-described processing functions. The programs may be stored in computer-readable media. Such computer-readable storage media include magnetic storage apparatuses, optical discs, magneto-optical storage media, semiconductor memory devices, and other non-transitory storage media. The examples of the magnetic storage apparatuses include a hard disk drive (HDD; Hard disk Drive), a flexible disc (FD), and a magnetic tape. The examples of the optical disc include a DVD (Digital Versatile Disc), a DVD-RAM, a CD (Compact Disc)-ROM, and a CD-R (Recordable)/RW (Re-Writable). The examples of the magneto-optical storage medium include an MO (Magneto-Optical disc).

When a program is distributed, portable storage media, such as a DVD and a CD-ROM, on which the program is recorded, are sold, for example. Moreover, network-based distribution of software programs may also be possible, in which case program files are stored in a storage apparatus of a server computer for downloading to other computers via a network.

A computer executing a program stores, in its storage devices, for example, programs stored in a portable storage medium or programs transferred from a server computer. The computer reads a program from the storage device and executes a procedure according to the program. Note that the computer may also read a program directly from the portable storage medium and execute a procedure according to the program. Another alternative method is that the computer executes programs as they are downloaded from a server computer connected via a network.

Moreover, at least some of the above-described processing functions may be realized by an electronic circuit, such as DSP (Digital Signal Processor), an ASIC (Application Specific Integrated Circuit), or a PLD (Programmable Logic Device).

In the embodiments, a liquid crystal display apparatus has been illustrated as an example of the disclosure, but other application examples include all the flat panel type display apparatuses, such as an organic EL (ElectroLuminescence) display apparatus, other self-luminous display apparatuses, or an electronic paper type display apparatus with an electrophoresis element and the like. Moreover, it is needless to say that the embodiments may be applicable to the small, middle to large type display apparatuses without specifically limiting the size of the display apparatus.

Moreover, in the above-described first to fourth embodiments, needed constituent elements may be appropriately combined in accordance with the specification and the like of a product.

(1) According to an embodiment disclosed herein, there is provided a display apparatus including: a touch panel including a driving electrode and a sensing electrode that faces at least a part of the driving electrode across a dielectric substance, the touch panel being configured to output a detection signal from the sensing electrode in synchronization with a driving signal applied to the driving electrode; a pointing device configured to point to a position on a touch surface of the touch panel; a detection assisting device including an inverting circuit configured to obtain a detection driving signal corresponding to the driving signal detected by the pointing device and generate an inversion signal by inverting a phase of the detection driving signal, the detection assisting device being configured to output the inversion signal to the sensing electrode via the pointing device; and a control device configured to apply the driving signal to the driving electrode, obtain the detection signal that is generated at the sensing electrode according to a mutual capacitance between the driving electrode and the sensing electrode and the inversion signal, and detect the pointing device in contact with or proximity to the touch panel based on the detection signal.

(2) According to an embodiment disclosed herein, there is provided the display apparatus according to (1), in which the detection assisting device is provided in the pointing device.

(3) According to an embodiment disclosed herein, there is provided the display apparatus according to (1), in which the detection assisting device further includes an amplifier circuit configured to amplify the inversion signal by a predetermined gain, and the detection assisting device outputs the amplified inversion signal to the sensing electrode via the pointing device.

(4) According to an embodiment disclosed herein, there is provided the display apparatus according to (3), in which the pointing device detects whether or not the pointing device is in contact with the touch surface, and notifies the detection assisting device of a detection result, and the detection assisting device switches an amplification level for amplifying the inversion signal based on the detection result, by setting a gain of the amplifier circuit to a first gain when the pointing device is in contact with the touch surface and by setting the gain of the amplifier circuit to a second gain when the pointing device is not in contact with the touch surface.

(5) According to an embodiment disclosed herein, there is provided the display apparatus according to (1), in which the detection assisting device further includes: a frequency selection circuit configured to compare a signal component included in the detection driving signal with a frequency of the driving signal, select a first signal having a same frequency as the driving signal, and output the first signal to the inverting circuit; and an adder circuit configured to add a second signal having a frequency different from a frequency of the driving signal to a first inversion signal, which is obtained by inverting a phase of the first signal by the inverting circuit, in order to correct the first inversion signal to generate a correction inversion signal, and the detection assisting device outputs the correction inversion signal to the sensing electrode via the pointing device.

(6) According to an embodiment disclosed herein, there is provided the display apparatus according to (5), in which the control device includes a noise detection unit configured to collate the detection signal with predefined noise information, change a frequency of the driving signal when determining that noise is included in the detection signal, and notify the detection assisting device of the changed frequency, the detection assisting device obtains the changed frequency, and the frequency selection circuit uses the changed frequency for selection of a signal component included in the detection driving signal.

(7) According to an embodiment disclosed herein, there is provided the display apparatus according to (1), in which the detection assisting device further includes a phase adjustment circuit configured to compare a phase of an auxiliary signal to be output to the sensing electrode via the pointing device with a phase of the detection driving signal, determine whether or not an amount of phase delay of the auxiliary signal relative to the detection driving signal is within a predetermined allowable range, and align the phase of the auxiliary signal with the phase of the detection driving signal when the amount of phase delay exceeds the allowable range.

(8) According to an embodiment disclosed herein, there is provided a method for driving a display apparatus, the display apparatus including a touch panel and a pointing device, the touch panel including a driving electrode and a sensing electrode that faces at least a part of the driving electrode across a dielectric substance, the touch panel being configured to output a detection signal from the sensing electrode in synchronization with a driving signal applied to the driving electrode, the pointing device being configured to point to a position on a touch surface of the touch panel. The method includes: applying, by a control device, the driving signal to the driving electrode; obtaining, by a detection assisting device, a detection driving signal corresponding to the driving signal detected by the pointing device; generating, by the detection assisting device, an inversion signal by inverting a phase of the detection driving signal; outputting, by the detection assisting device, the inversion signal to the sensing electrode via the pointing device; obtaining, by the control device, the detection signal generated at the sensing electrode according to a mutual capacitance between the driving electrode and the sensing electrode and the inversion signal; and detecting, by the control device, the pointing device in contact with or proximity to the touch panel based on the detection signal.

(9) According to an embodiment disclosed herein, there is provided a pointing device for pointing to a position on a touch surface of a touch panel including a driving electrode and a sensing electrode that faces at least a part of the driving electrode across a dielectric substance, the touch panel being configured to output a detection signal from the sensing electrode in synchronization with a driving signal applied to the driving electrode. The pointing device includes: an inverting circuit configured to detect a detection driving signal corresponding to the driving signal and generate an inversion signal by inverting a phase of the detection driving signal; and an output unit configured to output the inversion signal to the sensing electrode, wherein the pointing device causes, when the driving signal is applied to the driving electrode, the sensing electrode to generate the detection signal according to a mutual capacitance between the driving electrode and the sensing electrode and the inversion signal.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A display apparatus comprising:
   a touch panel including a driving electrode and a sensing electrode that faces at least a part of the driving electrode across a dielectric substance, the touch panel being configured to output a detection signal from the sensing electrode in synchronization with a driving signal applied to the driving electrode;
   a pointing circuit configured to point to a position on a touch surface of the touch panel;
   a detection assisting circuit including an inverting circuit configured to obtain a detection driving signal corresponding to the driving signal detected by the pointing circuit and generate an inversion signal by inverting a phase of the detection driving signal, the detection assisting circuit being configured to output the inversion signal to the sensing electrode via the pointing circuit;
   a touch-panel control circuit configured to apply the driving signal to the driving electrode, obtain the detection signal that is generated at the sensing electrode according to a mutual capacitance between the driving electrode and the sensing electrode and the inversion signal, and detect the pointing circuit in contact with or proximity to the touch panel based on the detection signal; and
   a phase adjustment circuit configured to compare a phase of an auxiliary signal to be output to the sensing electrode via the pointing circuit with the phase of the detection driving signal, determine whether or not an amount of phase delay of the auxiliary signal relative to the detection driving signal is within a predetermined allowable range, and align the phase of the auxiliary signal with the phase of the detection driving signal when the amount of phase delay exceeds the predetermined allowable range.

2. The display apparatus according to claim 1, wherein the touch-panel control circuit includes a noise detection circuit configured to store predicted noise patterns generated from a charger connected to the display apparatus, collate the detection signal with a noise pattern among the predicted noise patterns, and change a frequency of the driving signal when determining that the noise pattern is included in the detection signal.

3. A method for driving a display apparatus, the display apparatus including a touch panel and a pointing circuit, the touch panel including a driving electrode and a sensing electrode that faces at least a part of the driving electrode across a dielectric substance, the touch panel being configured to output a detection signal from the sensing electrode in synchronization with a driving signal applied to the driving electrode, the pointing circuit being configured to point to a position on a touch surface of the touch panel, the method comprising:
   applying, by a touch-panel control circuit, the driving signal to the driving electrode;
   obtaining, by a detection assisting circuit, a detection driving signal corresponding to the driving signal detected by the pointing circuit;
   generating, by the detection assisting circuit, an inversion signal by inverting a phase of the detection driving signal;
   outputting, by the detection assisting circuit, the inversion signal to the sensing electrode via the pointing circuit;
   obtaining, by the touch-panel control circuit, the detection signal generated at the sensing electrode according to a mutual capacitance between the driving electrode and the sensing electrode and the inversion signal;
   detecting, by the touch-panel control circuit, the pointing circuit in contact with or proximity to the touch panel based on the detection signal; and comparing, by the detection assisting circuit, a phase of an auxiliary signal to be output to the sensing electrode via the pointing circuit with the phase of the detection driving signal, determining whether or not an amount of phase delay of the auxiliary signal relative to the detection driving signal is within a predetermined allowable range, and aligning the phase of the auxiliary signal with the phase of the detection driving signal when the amount of phase delay exceeds the predetermined allowable range.

4. The method for driving a display apparatus according to claim 3, wherein the touch-panel control circuit includes a noise detection circuit configured to store predicted noise patterns generated from a charger connected to the display apparatus, collate the detection signal with a noise pattern among the predicted noise patterns, and change a frequency of the driving signal when determining that the noise pattern is included in the detection signal.

* * * * *